United States Patent [19]
Moore

[11] 3,979,743
[45] Sept. 7, 1976

[54] DISPLAYS
[75] Inventor: William Thomas Moore, London, England
[73] Assignee: The Rank Organisation Limited, London, England
[22] Filed: Feb. 20, 1975
[21] Appl. No.: 551,420

[30] Foreign Application Priority Data
Feb. 20, 1974 United Kingdom.................. 7678/74

[52] U.S. Cl............................... 340/324 R; 324/96; 350/160 LC
[51] Int. Cl.² ........................................ G01R 13/40
[58] Field of Search........... 340/324 R; 350/160 LC; 324/96

[56] References Cited
UNITED STATES PATENTS

| | | | |
|---|---|---|---|
| 3,667,039 | 5/1972 | Garfein et al. ................... | 340/324 R |
| 3,727,527 | 4/1973 | Borowski et al. .............. | 350/160 LC |
| 3,774,195 | 11/1973 | Schulthess et al. ............. | 340/324 R |
| 3,820,875 | 6/1974 | Bohmer ......................... | 350/160 LC |
| 3,834,794 | 9/1974 | Soref ............................. | 350/160 LC |
| 3,846,775 | 11/1974 | Epstein .......................... | 350/160 LC |
| 3,857,628 | 12/1974 | Strong ........................... | 350/160 LC |
| 3,869,196 | 3/1975 | Kubota .......................... | 350/160 LC |

*Primary Examiner*—David L. Trafton
*Attorney, Agent, or Firm*—Brisebois & Kruger

[57] ABSTRACT

A liquid crystal analogue display device has a pair of electrodes between which a nematic liquid crystal material is disposed, so that the liquid crystal is switched from a homogeneous to a homeotropic state when the voltage between the electrodes exceeds a given threshold. A potential gradient is established along one of the electrodes, and a variable potential, within this gradient, is applied to the other electrode, for example from a fuel tank contents gauge. The position at which a low voltage or null, below the threshold switching potential, is established between the two electrodes will be dependent upon the magnitude of the variable voltage, so that by suitable illumination of the cell a movable display such as a line is obtained which is a direct analogue of the quantity represented by the variable voltage.

13 Claims, 4 Drawing Figures

DISPLAYS

This invention relates to display devices, and is particularly, but not exclusively, applicable to analogue displays.

The present invention makes use of a liquid crystal cell, which has been proposed in recent years for various uses in electro-optical displays, usually to provide fixed symbolic or digital displays. Liquid crystal display devices make use of the property of certain liquid crystal materials whereby they are normally in a nematic state with a degree of molecular anisotropy. Moreover, the liquid crystal material in its homogeneous nematic state is such that its molecules align themselves generally with linear surface features of a surface with which the liquid crystal is in contact. If the liquid crystal material is contained between two cell walls which have linear surface features in different directions, produced, for example, by rubbing of the inside surfaces of the cell walls, the liquid crystal molecules will align themselves with the linear surface features on both cell walls, and in consequence plane polarised light entering the cell with its plane of polarisation either parallel to, or perpendicular to the direction of alignment of the liquid crystal molecules at the surface of entry will have its plane of polarisation rotated in traversing the cell, according to the twist applied to the nematic liquid crystal between the cell walls. Since the homogeneous nematic state of a positive dielectric anisotropy liquid crystal can be destroyed by the application of an electric field such a liquid crystal cell has useful application as a light switch. For this purpose plane-polarised light is directed into the cell with its plane of polarisation parallel to, or alternatively perpendicular to, the direction of the linear surface features in the surface of entry to the cell: in the absence of an applied electric field the plane polarised light will follow the direction of twist of the nematic liquid crystal molecules and will emerge from the cell through the opposite wall with its plane of polarisation different from that upon entry. It can be arranged that the plane of polarisation of the light is rotated through 90° upon traversing the cell, so that the light emerges from the cell with its plane of polarisation parallel to that of an anlyser suitably "crossed" with respect to a polariser on the entry side of the cell, the light being therefore substantially undiminished in intensity in traversing the cell. Upon the application of an electric field to the cell above a threshold value the nematic state of the liquid crystal is destroyed and the liquid crystal assumes a homeotropic state. The plane of polarisation of the light traversing the cell then remains unchanged, so that the light is blocked by the crossed analyser. Alternatively a parallel polariser and analyser can be used, in which case the cell will block the polarised light when the liquid crystal is in its homogeneous state and will transmit the light when the liquid crystal is in its homeotropic state.

A liquid crystal cell of the type described above is capable of producing displays with sharp contrast. Electro-optical displays can also be produced using liquid crystal cells by taking advantage of the dynamic light-scattering properties of some liquid crystal materials: in the unexcited state the liquid crystal transmits plane-polarised light, as described above, with relatively little scattering, while if subjected to an electric field in excess of a threshold value, the liquid crystal material scatters light entering the cell. This property, like the previously described one, can be utilised to produce a light display against a dark background or a dark display against a light background, according to the illumination (or polarisation) conditions.

For the purpose of the present Specification a liquid crystal cell is defined as comprising two parallel flat transparent cell walls between which a liquid crystal material is contained, and means for applying a potential difference between electrodes on the inside surfaces of the cell walls, the liquid crystal material undergoing transition from the homogeneous state to the homeotropic state when the potential difference applied across the cell exceeds a predetermined switching threshold.

According to the present invention there is provided an analogue display device comprising a liquid crystal cell as herein defined, means applying a voltage along one of the electrodes to establish a potential gradient along said electrode, and means applying to the other electrode a potential such that, at a region within the cell dependent upon the magnitude of said potential the potential difference between the electrodes is less than the switching threshold of the liquid crystal materia, while the said potential difference is greater than the said threshold outside this region, so that the liquid crystal is in a homogeneous state in said region and in a homeotropic state outside said region, giving rise to a visual display when light is directed into the cell under conditions in which the emergent light is modified according to the state of the liquid crystal in the region traversed by the light.

The liquid crystal cell will in practice be arranged in an optical system such as to provide a visual display of the desired type. Preferably, the cell is illuminated with plane-polarised light which enters the cell through one wall with its plane of polarisation parallel or perpendicular to the direction of linear surface features on the inside surface of said wall and which, in the homogeneous state of the liquid crystal material, leaves the cell through the other cell with its plane of polarisatin respectively parallel or perpendicular to the direction of linear surface features on the inside surface of the other cell wall, an analyser being arranged at the other cell wall. The polarisation direction of the analyser may be parallel to the direction of the linear surface features on the inside surface of the exit wall of the cell, this direction being preferably perpendicular to the plane of polarisation of the light entering the cell. With this arrangement, the display provided by the device will consist of a bright or illuminated region where the potential difference between the two electrodes is lower than the threshold, seen against a dark background region where the potential difference between the electrodes is greater than the threshold. Alternatively, the analyser may be arranged with its polarisation direction perpendicular to the linear surface features on the inside surface of the exit wall of the cell, in which case the display provided by the device will comprise a dark region where the potential difference between the two electrodes is lower than the threshold, against a light background where the said potential difference exceeds the threshold. Alternatively the analyser can be rotated through 90° to give a black-on-white display. The black-on-white mode of operation is preferred where a narrow line is to be displayed, since a black band appears narrower than a white band of the same width.

The position of the region in the cell where the potential difference between the electrodes is less than the switching threshold, and where, therefore, the liquid crystal material is in its homogeneous state, will vary according to the potential applied to the other electrode. Alternatively, if the potential applied to the other electrode is fixed, the width of the said region in the liquid crystal cell will be dependent upon the magnitude of the potential gradient applied to the said one electrode. Alternatively, if the potential applied to the other electrode is fixed, the width of the said region in the liquid crystal cell will be dependent upon the magnitude of the potential gradient applied to the said one electrode.

In preferred embodiments of the invention an alternating voltage is applied along the said one electrode and the means applying a potential to the other electrode comprises a potentiometric device which derives from the alternating voltage a potential intermediate the extremes of the potential gradient applied to the one electrode.

For a narrow display band it is preferably arranged that, in addition to the applied alternating voltage, an alternating bias voltage having a root mean square value less than the threshold potential difference is applied between the electrodes so that the potential difference between the electrodes at no place falls below the said bias voltage. The bias voltage may be provided by a variable a.c. bias voltage supply superimposed upon the potential applied to the said other electrode. Alternatively the bias voltage may result from a capacitive coupling between the alternating voltage supply to the one electrode and the potentiometric device connected to the other electrode.

According to one embodiment of the invention the potential gradient applied to the one electrode is fixed and the potential applied to the other electrode is variable, being determined by or representative of a quantity or parameter to be displayed, so that the position of the said region within the cell where the liquid crystal material is in its homogeneous state will vary according to the potential applied to the other electrode. This latter potential may, for example, be derived from a potentiometric device such as, for example, a fuel contents gauge, a temperature gauge, a pressure gauge, or may be derived from a speedometer or tachometer, to give an analogue display. A reading of the magnitude of the quantity to be displayed may conveniently be provided by a calibrated scale on one of the walls of the cell, within the range of positions occupied by the homogeneous region of the liquid crystal material.

In an alternative embodiment of the invention the potential applied to the other electrode is substantially equal to the mean of the potential gradient applied to the one electrode, and means are provided for varying the potential gradient applied to the other electrode. In this case the width of the homogeneous region in the liquid crystal cell will be dependent upon the magnitude of the potential gradient, which now becomes the displayed parameter. Such a display may be utilised in a motor vehicle instrument panel head-up display to provide the driver with an indication of the minimum apparent distance to be maintained between the tail lights of a preceding vehicle for a given speed, the potential gradient applied to the said one electrode being derived from the speedometer of the vehicle.

In another embodiment of the invention providing a display of variable band-width type the one electrode has a centre tap which is connected to an alternating voltage, the two ends of the one electrode being interconnected, so that potential gradients are established between the centre tap and the said two ends, the potential applied to the other electrode being substantially constant, and such that a band-type visual display is achieved, the width of the band being dependent upon the magnitude of the said alternating voltage. Alternatively, the device may include two liquid crystal cells or two regions of the same cell arranged in juxtaposition to provide a display comprising two regions which move together or apart in dependence upon the magnitude of a voltage derived, for example, from a vehicle speed measuring device.

The display device of the present invention can be used to provide more than one display of different parameters. For example more than one pair of electrodes may be mounted in the cell for this purpose, and one of the electrodes in the cell may be common to more than one said pair of electrodes. In addition the same cell as that employed in the display device may also incorporate other displays such as, for example caption displays or 7-bar numeric displays, or may incorporate an electro-optical shutter.

Since the potential gradient applied to the said one electrode simply determines the width of the nematic region of the liquid crystal, and therefore the sidth of the visual display, the device according to the invention is not critically sensitive to changes in the supply voltage, and a stabilised alternating current supply is not, therefore, essential, in contrast with the usual type of motor vehicle instrumentation, which generally requires a stabilised supply voltage.

The display device according to the invention is, moreover, particularly suitable for the projection of visual displays, for example on to a vehicle windscreen, for providing a "head-up" display. Thus means may be provided for projecting light which has passed through the cell on to a screen, such as a vehicle windscreen, to form an image of the desired visual display on the screen.

The invention is illustrated, by way of example, in the accompanying drawings, in which.

Figure 1:
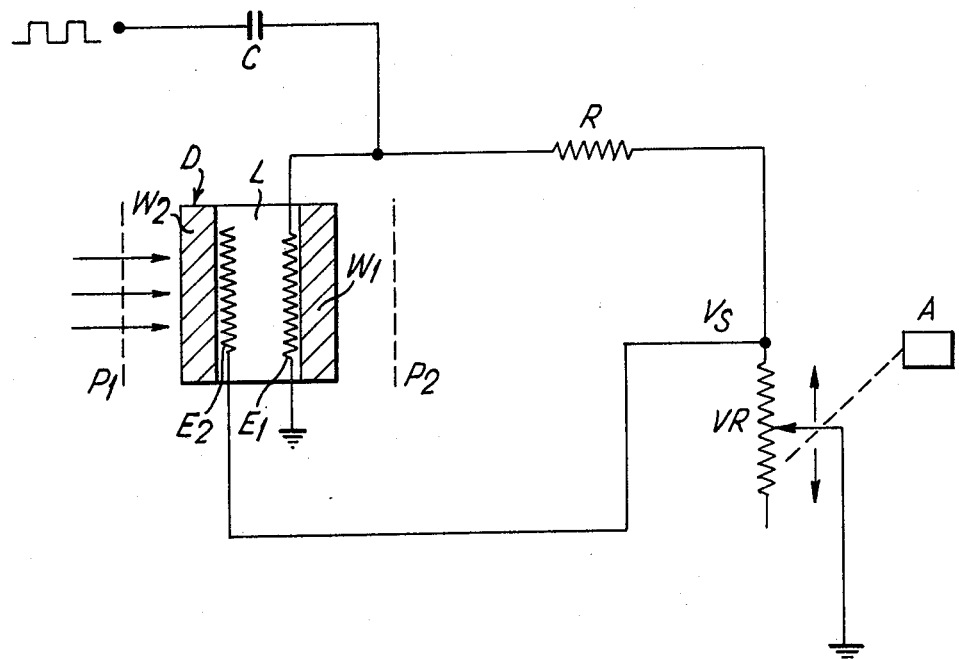
FIG. 1 is a schematic circuit diagram of a display device according to one embodiment of the invention.

Referring first to FIG. 1, an alternating current source, derived, for example, from an alternator in a motor vehicle, is applied through a blocking capacitor C across a voltage divider consisting of a fixed resistor R and a variable resistor VR. The blocking capacitor C will be needed in practice only if the alternating current supply has a direct current component. The variable resistor VR comprises a potentiometer the slider of which is in this embodiment maintained at earth potential. The potentiometer in this example forms part of a fuel tank contents gauge and the position of the potentiometer slider is determined by a fuel level sensor A (shown diagrammatically) to which the slider is connected. The potential $V_s$ at the junction of the fixed resistor R and the potentiometer VR will be dependent upon the position of the slider of the potentiometer and, therefore, on the contents of the vehicle fuel tank.

The alternating voltage supply is connected across the ends of one electrode $E_1$ of a liquid crystal display cell D to establish an alternating potential gradient along the said electrode $E_1$. The electrode $E_1$ is arranged parallel to the walls $W_1$ and $W_2$ of the cell D and is spaced from a second parallel electrode $E_2$, to which the signal voltage is applied. The electrodes $E_1$ and $E_2$ are applied to the internal surfaces of the cell walls $W_1$ and $W_2$. These internal faces have linear surface features produced, for example, by rubbing, in two mutually perpendicular directions.

From the circuit it will be apparent that the signal voltage $V_s$ applied to the electrode $E_2$ will have a magnitude intermediate the extremes of the potential gradient applied along the first electrode $E_1$, so that at a given null position along the two electrodes $E_1$, $E_2$ the potential difference between the electrodes $E_1$, $E_2$ will be zero, this position being in the center of a region in which this potential difference between the electrodes $E_1$ and $E_2$ is less than the switching threshold of the liquid crystal L filling the cell D, while the potential difference between the electrodes $E_1$, $E_2$ outside this region is greater than the switching threshold.

This null position will vary in dependence upon the magnitude of the signal voltage $V_s$ and, therefore, upon the setting of the potentiometer VR, which in turn is indicative of the fuel tank contents. The liquid crystal material in the cell D will remain in its homogeneous state in the said region, but will be switched into its homeotropic state outside this region.

In the illustrated embodiment of the invention the liquid crystal cell D is arranged to have 90° twist between the two electrodes $E_1$ and $E_2$ and crossed polarisers $P_1$ and $P_2$ are arranged at the entrance and exit faces of the cell with their polarising directions parallel to the rubbing directions of the respective internal faces of the cell so that plane polarised light is transmitted through the cell without substantial reduction of intensity when the liquid crystal material L through which the light passes is in its homogeneous state, in which it rotates the plane of polarisation of the light, while the light is effectively blocked when the liquid crystal material L is switched into its homeotropic state, in which it does not rotate the plane of polarisation of the light passing therethrough. The cell D therefore provides an illuminated analogue display in the form of a light band at the region where the liquid crystal is in its homogeneous state, at a position, viewed against a dark background, which is indicative of the setting of the potentiometer VR and, therefore of the fuel tank contents.

It will be appreciated that by providing other electrodes in the same cell D it is possible to display simultaneously by means of one single cell D different parameters.

Figure 2:
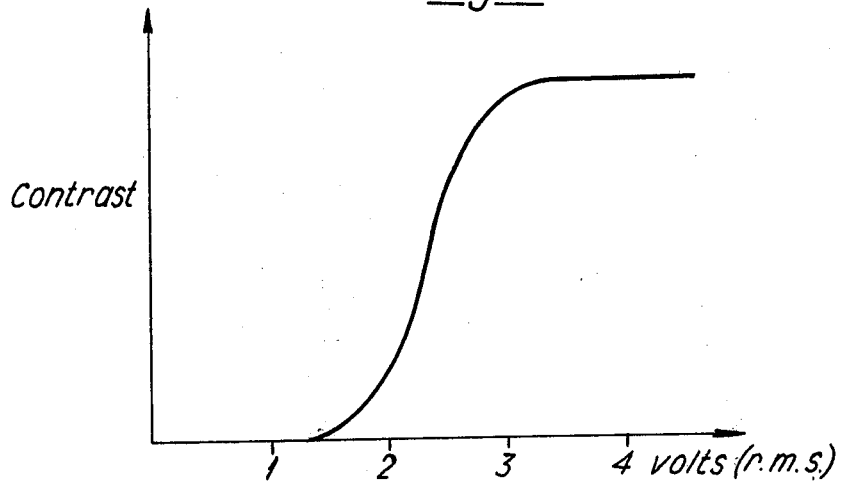
FIG. 2 illustrates graphically the observed contrast of a display provided by a liquid crystal cell device as a function of the root mean square (r.m.s.) voltage applied between the cell electrodes.

Referring to FIG. 2, it will be seen that the contrast change observed in practice when the potential difference between the electrodes of the liquid crystal cell exceeds the threshold value is not a sharp change, but a progressive one. In the illustrated example, employing a biphenyl liquid crystal material, the transition from the homogeneous to the homeotropic state commences at an applied r.m.s. voltage between the cell electrodes of 1.5 volts, and is complete at 3 volts: the lower limit of the threshold voltage is 1.5 volts in this example. For voltages less than 1.5 volts there is no change in the state of the liquid crystal.

In order to narrow the observed band in a liquid crystal display device of the kind described with reference to FIG. 1, therefore, it should be arranged that the voltage between the electrodes does not fall below 1½ volts: in the device of FIG. 1, where a zero potential difference exists at one point between the two electrodes, there will be a 'dead' region on each side of this point where the voltage between the electrodes is in the range of 0–1.5 volts, giving a fairly wide display band. For a narrow display band, therefore a bias voltage should be established between the two electrodes, such that the voltage between the electrodes never falls below this bias voltage. In the illustrated example this bias voltage would be 1.5 volts: with such an arrangement the display band of the device would have a width corresponding to variation in the voltage between the electrodes only in the range 1.5–3 volts as compared with the wider band associated with the voltage variation in the range 0–3 volts where the voltage between the electrodes is allowed to fall to zero.

Figure 3:
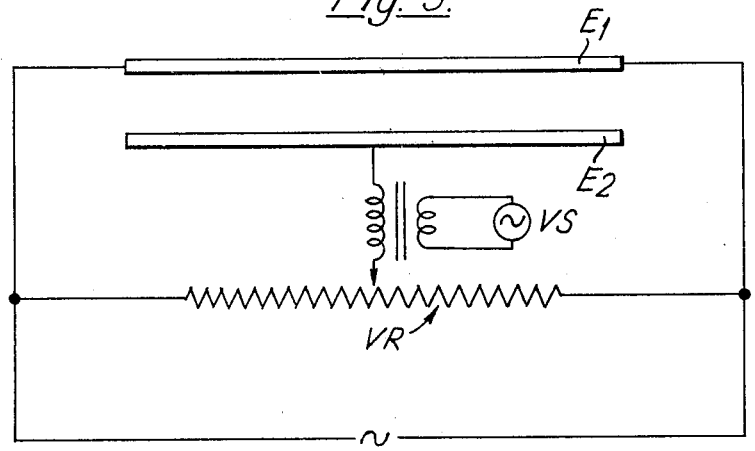
FIGS. 3 and 4 illustrate two circuit arrangements of display devices according to the invention for providing a narrow band display.

FIG. 3 illustrates one method of applying the bias voltage, using a variable voltage a.c. source VS to superimpose a bias voltage of 1½ volts r.m.s. on the potential applied to the electrode $E_2$ from the potentiometer VR.

Figure 4:
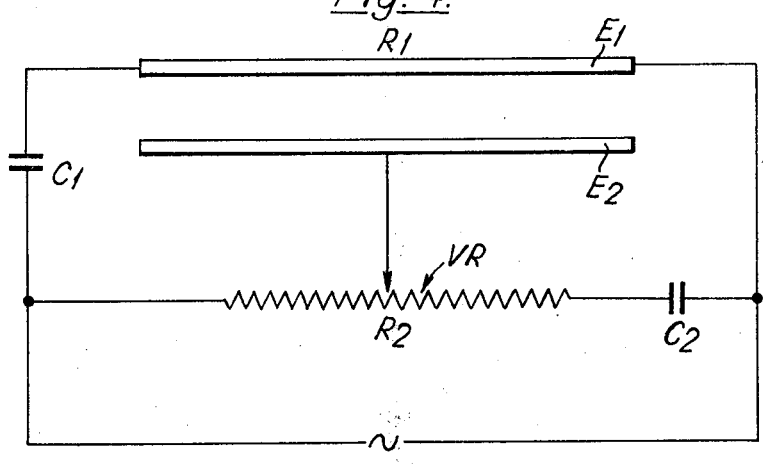

FIG. 4 illustrates an alternative method of applying the bias voltage, employing capacitors $C_1$ and $C_2$ coupling the electrode $E_1$ and the potentiometer VR to the alternating current supply. If the resistance of the electrode $E_1$ is $R_1$ and the total resistance of the potentiometer VR is $R_2$ then the ratios $C_1/R_1$ and $C_2/R_2$ are chosen so as to establish a predetermined phase relationship between the alternating voltages applied to the electrodes $E_1$ and $E_2$ such as to give the required bias voltage between the electrodes.

By holding the potential applied to the second electrode $E_2$ at a steady value and varying the potential gradient applied to the first electrode $E_1$ the width of the homogeneous region of the liquid crystal cell D can be varied according to the variation of the potential gradient, and if this potential gradient is in turn derived from a signal to be displayed, for example from the speedometer of the vehicle, the width of the illuminated display will be dependent upon that value, and could be arranged to provide, by suitable projection, a 'head-up' display on a vehicle windscreen, consisting of a band of light the width of which represents, for a given speed of the vehicle, the observed distance between the tail lights of a preceding vehicle at a minimum safe following distance.

In practice a 'head-up' display as aforesaid is preferably provided by two 'back-to-back' potentiometric line displays of the kind described previously arranged to move respective display lines horizontally across the windscreen of a vehicle in opposite directions in dependence upon vehicle speed to provide a display comprising two lines separated by the requisite observed tail light spacing for a preceding vehicle at the minimum safe distance in front of the vehicle carrying the display device.

What is claimed is:

1. A display device comprising a liquid crystal cell having two parallel flat transparent cell walls, a liquid crystal material contained between said walls, electrodes disposed inwardly of said cell walls and means for applying a potential difference between said electrodes, the liquid crystal material undergoing transition from the homogeneous state to the homeotropic state when the potential difference applied between said electrodes exceeds a predetermined switching threshold, wherein the improvement consists in
 a. an alternating current source,
 b. means to said alternating current source for applying an alternating voltage along one of said electrodes to establish an alternating potential gradient along said electrode,
 c. a potentiometric device connected to said alternating current source and to the other electrode to apply thereto a variable alternating potential intermediate the extremes of the potential gradient applied to said one electrode, such that,
 d. at a region within the cell dependent upon the magnitude of said potential, the potential difference between the electrodes is less than the switching threshold of the liquid crystal material, while the said potential difference is greater than the said threshold outside this region, whereby the liquid crystal is in a homogeneous state in said region and in a homeotropic state outside said region, the cell providing a visual display of said region when light is directed into the cell under conditions in which the emergent light is modified in dependence upon the state of the liquid crystal.

2. The display device defined in claim 1, wherein there is more than one pair of electrodes in the cell for providing more than one visual display.

3. The display device defined in claim 2, wherein one of the electrodes in the cell is common to more than one said pair of electrodes.

4. The display device defined in claim 1, wherein the liquid crystal cell is arranged to produce a display by dynamic scattering of light directed through regions of the liquid crystal where the potential difference between the electrodes exceeds the switching threshold.

5. The display device defined in claim 1, wherein the two cell walls have linear surface features on their inside faces, and including means for illuminating the cell with plane polarised light which enters the cell through one wall with its plane of polarisation parallel to the direction of the linear surface features on the inside surface of said wall, the polarised light leaving the cell through the other cell wall with its plane of polarisation parallel to the direction of the linear surface features on the inside surface of the other cell wall, the said plane of polarisation being rotated or unchanged as the light traverses the cell according to whether the liquid crystal is in its homogeneous or homeotropic state respectively, and analyser means arranged at the other cell wall upon which the plane polarised light is incident after traversing the cell.

6. The display device defined in claim 1, wherein the two cell walls have linear surface features on their inside faces, and including means for illuminating the cell with plane polarised light which enters the cell through one wall with its plane of polarisation perpendicular to the direction of the linear surface features on the inside surface of said wall, the polarised light leaving the cell through the other cell wall with its plane of polarisation perpendicular to the direction of the linear surface features on the inside surface of the other cell wall, the said plane of polarisation being rotated or unchanged as the light traverses the cell according to whether the liquid crystal is in its homogeneous or homeotropic state respectively, and analyser means arranged at the other cell wall upon which the plane polarised light is incident after traversing the cell.

7. The display device defined in claim 5, wherein the polarisation direction of the analyser means is parallel to the direction of linear surface features on the inside surface of the said other cell wall, this direction being perpendicular to the plane of polarisation of the light entering the cell.

8. The display device defined in claim 5, wherein the polarisation direction of the analyser means is perpendicular to the direction of the linear surface features on the inside surface of the said other wall of the cell and is parallel to the plane of polarisation of the light entering the cell.

9. The display device defined in claim 1, including two liquid crystal cell elements arranged in juxtaposition to provide a display comprising two regions which move together or apart in dependence upon the magnitude of a voltage derived, for example, from a vehicle speed measuring device.

10. The display device defined in claim 9, wherein the two liquid crystal cell elements comprise neighbouring regions of the same liquid crystal cell.

11. The display device defined in claim 1, including means for superimposing on the voltage between the two electrodes an alternating bias voltage having a root mean square value less than the said threshold potential difference between said electrodes, whereby the potential difference between the electrodes at no place falls below said bias voltage.

12. The display device defined in claim 11, wherein the means for superimposing the alternating bias voltage comprise a variable alternating bias voltage source connected to said other electrode.

13. The display device defined in claim 11, wherein the means for superimposing the alternating bias voltage include capacitive coupling means between the alternating current source connected to the one electrode and the potentiometric device connected to the other electrode.

* * * * *